(12) United States Patent
Liu

(10) Patent No.: US 7,815,333 B2
(45) Date of Patent: Oct. 19, 2010

(54) SOLAR LED LAMP

(75) Inventor: You-Xue Liu, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 89 days.

(21) Appl. No.: 12/238,445

(22) Filed: Sep. 26, 2008

(65) Prior Publication Data
US 2010/0079984 A1 Apr. 1, 2010

(51) Int. Cl.
*F21L 4/00* (2006.01)
*F21S 8/00* (2006.01)
(52) U.S. Cl. ............... 362/145; 362/192; 362/157; 362/183
(58) Field of Classification Search ...... 362/145–153.1, 362/192, 157, 183
See application file for complete search history.

(56) References Cited

U.S. PATENT DOCUMENTS

| | | | | |
|---|---|---|---|---|
| 4,438,484 A | * | 3/1984 | Winden | 362/267 |
| 5,890,794 A | * | 4/1999 | Abtahi et al. | 362/294 |
| 6,406,163 B1 | * | 6/2002 | Yang | 362/183 |
| 6,457,847 B1 | * | 10/2002 | LeVasseur | 362/351 |
| 6,942,361 B1 | * | 9/2005 | Kishimura et al. | 362/240 |
| 7,524,089 B2 | * | 4/2009 | Park | 362/294 |
| 2006/0176684 A1 | * | 8/2006 | Richmond | 362/153 |
| 2008/0013306 A1 | * | 1/2008 | Guilmette | 362/183 |
| 2008/0232094 A1 | * | 9/2008 | Ramsdell | 362/153 |
| 2009/0040749 A1 | * | 2/2009 | Burgei et al. | 362/183 |

* cited by examiner

*Primary Examiner*—Jacob Y Choi
(74) *Attorney, Agent, or Firm*—Frank R. Niranjan

(57) ABSTRACT

A solar LED lamp includes an envelope having a seat, a first sleeve extending from the seat and a second sleeve extending from the first sleeve. An LED lamp is received in the second sleeve of the envelope. The LED lamp includes a heat sink and a plurality of LEDs attached to the heat sink. A solar panel covers the second sleeve of the envelope for collecting solar energy and converting the solar energy to electrical energy. A storage battery is accommodated in the first sleeve of the envelope for reserving the electrical energy from the solar panel and providing electrical energy to the LED lamp. A solar controller controls the solar panel to convert the solar energy to the electrical energy or not.

1 Claim, 5 Drawing Sheets

SOLAR LED LAMP

BACKGROUND OF THE INVENTION

1. Field of the Invention

The present invention relates to a solar LED (light-emitting diode) lamp, and more particularly to a solar LED lamp which utilizes solar energy to drive an LED lamp.

2. Description of Related Art

The technology of the LED has rapidly developed in recent years from indicators to illumination applications. With features of long-term reliability, environment friendliness and low power consumption, the LED is used as a light source in a lamp.

Generally, an LED lamp comprises a plurality of LEDs assembled on a board and driven by electrical power. The LED lamp is usually connected with an electrical power source by lines. Nowadays, the LED lamps are increasingly considered for indoor or outdoor lighting purposes. However, there are times when there is no primary source of electrical power available; for example, when a disaster strikes an area a black-out can last for several days for the area. There are districts that often face electricity shortages. In some remote areas as well as in mountainous areas, electricity is still scarce. In such situations an alternative source of electrical power should be used for driving the LED lamps.

The use of solar energy as a source of energy for some types of devices is well known and has been shown to be advantageous in situations where other sources of power are unavailable. Solar power is advantageous in situations where other power sources are unavailable because solar energy can be collected during the daylight hours via a solar panel, and released during the night hours. So, solar energy is a good power source substituting for electrical source to drive the LED lamps.

What is needed, therefore, is a solar LED lamp which is reliable and has a long life of use.

SUMMARY OF THE INVENTION

A solar LED lamp comprises an envelope having a seat, a first sleeve extending from the seat and a second sleeve extending from the first sleeve. An LED lamp is received in the second sleeve of the envelope. The LED lamp comprises a heat sink and a plurality of LEDs attached to the heat sink. A solar panel covers the second sleeve of the envelope for collecting solar energy and converting the solar energy to electrical energy. A storage battery is accommodated in the first sleeve of the envelope for reserving the electrical energy from the solar panel and the providing electrical energy to the LED lamp. A solar controller controls the solar panel to convert the solar energy to the electrical energy or not.

Other advantages and novel features of the present invention will become more apparent from the following detailed description when taken in conjunction with the accompanying drawings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
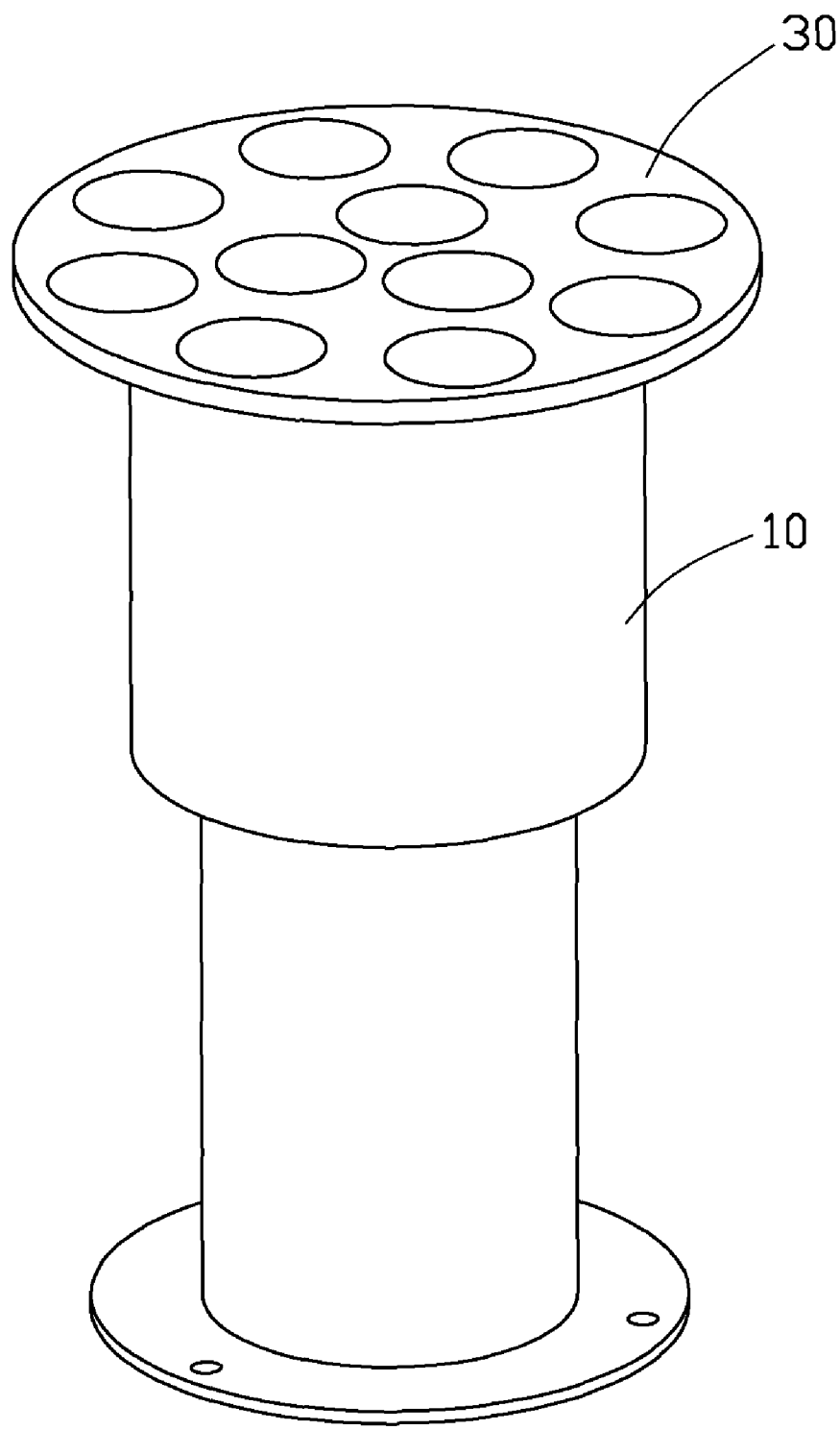
FIG. 1 is an assembled, isometric view of a solar LED lamp in accordance with a preferred embodiment of the present invention.
Figure 2:
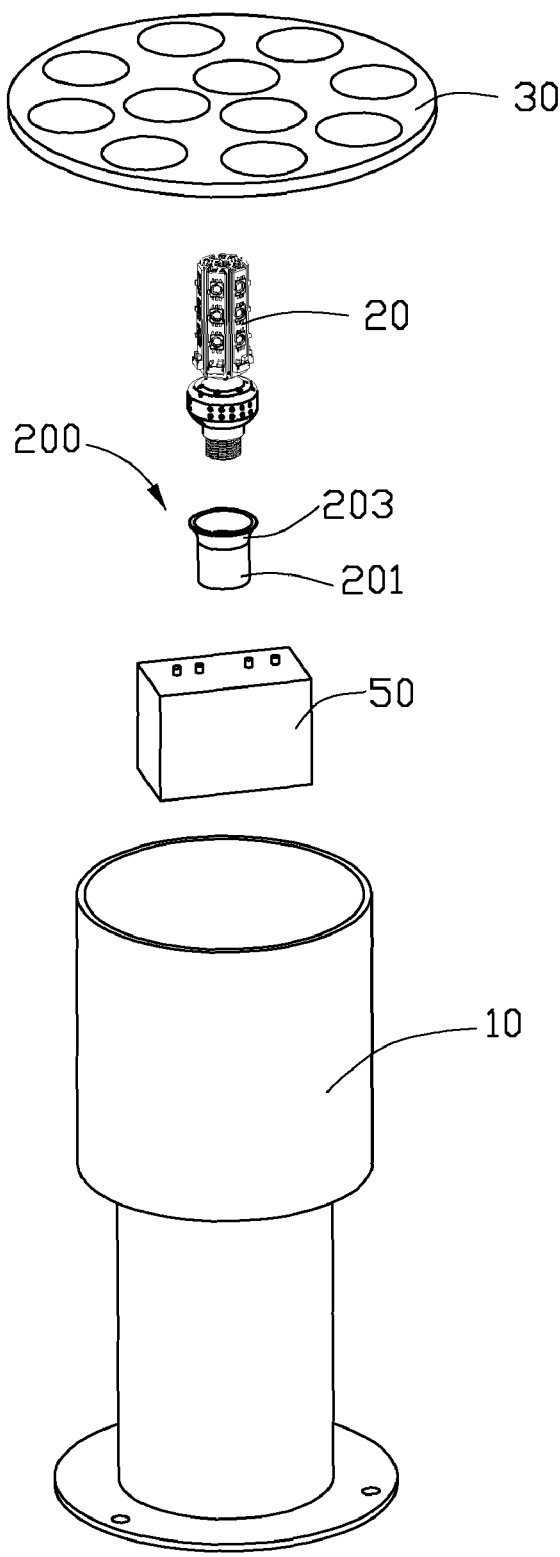
FIG. 2 is an exploded, isometric view of FIG. 1.
Figure 4:
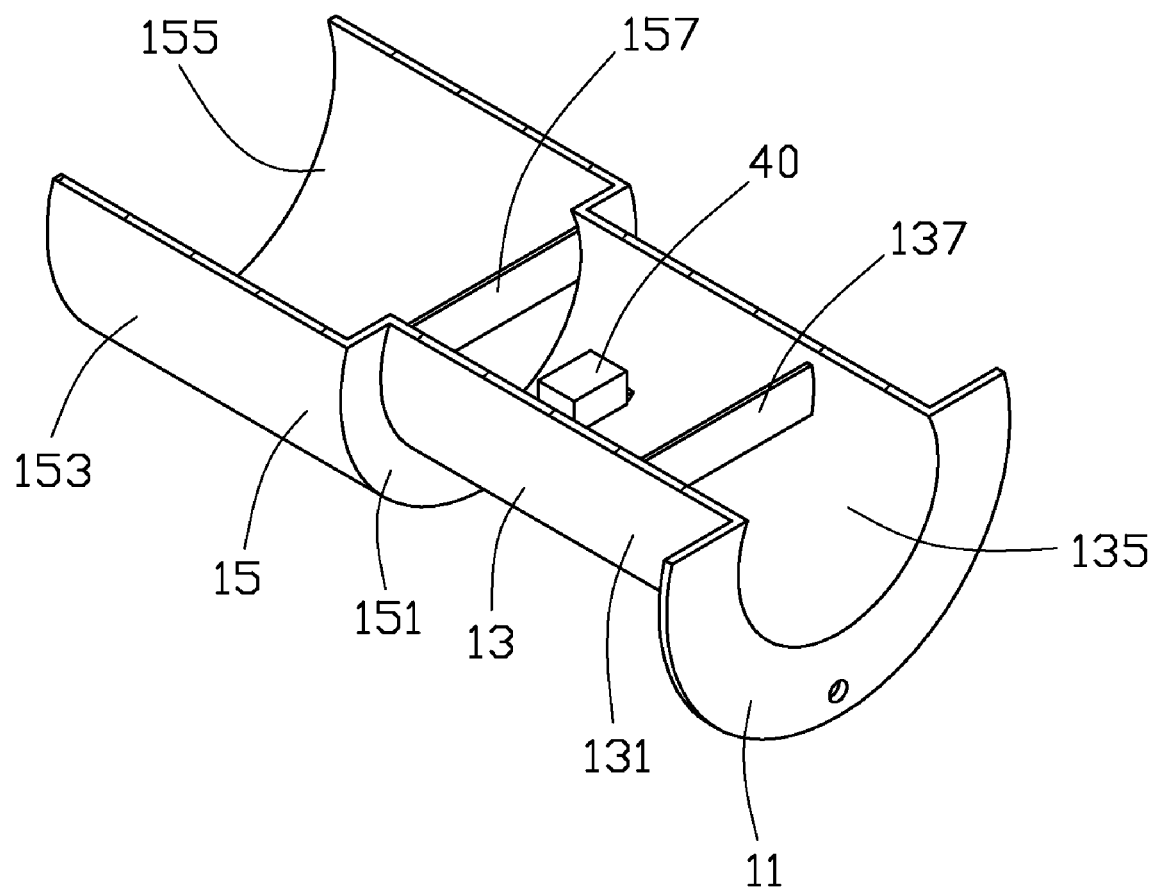
FIG. 4 is a cutaway view of an envelope and a charging controller of the solar LED lamp of FIG. 2.

Referring to FIGS. 1, 2 and 4, a solar LED lamp in accordance with a preferred embodiment of the present invention is shown. The solar LED lamp comprises an envelope 10, an LED lamp 20 mounted in the envelope 10, a solar panel 30 for collecting solar energy and converting the solar energy to electrical energy, a charging controller 40 accommodated in the envelope 10 for charging or discharging a storage battery 50 which reserves the electrical energy from the solar panel 30 and supplies DC power to drive the LED lamp 20, and a solar power controller 60 accommodated in the envelope 10 for controlling work of the solar panel 30. The LED lamp 20 is low-powered LED lamp which consumes a power of 6-10 watts and is driven by a DC (direct current) power.

Referring to FIGS. 2 and 4, the envelope 10 is a hollow cylinder, and comprises a seat 11, a first sleeve 13 perpendicularly extending from the seat 11, and a second sleeve 15 extending from the first sleeve 13. The seat 11 is an annular disk. The first sleeve 13 comprises a cylindrical first wall 131 surrounding a first room 135, and a first supporting plate 137 extending from an inner face of the first wall 131. The first room 135 extends through the seat 11. The first supporting plate 137 is in the room 135 surrounded by the first wall 131. The first room 135 at two sides of the first supporting plate 137 is in air communication. The seat 11 radially extends outwardly from a bottom end the first wall 131 of the first sleeve 13. The second sleeve 15 comprises a bottom 151 radially extending outwardly from a top end of the first wall 131 of the first sleeve 13, and a cylindrical second wall 153 perpendicularly extending from an edge of the bottom 151. The second wall 153 surrounds a second room 155. A second supporting plate 157 has two ends thereof extending from the bottom 151. The second room 155 is in communication with the first room 135 at two sides of the second supporting plate 157. The second room 155 has a diameter larger than that of the first room 135. The second wall 153 has a diameter larger than that of the first wall 131.

Figure 3:
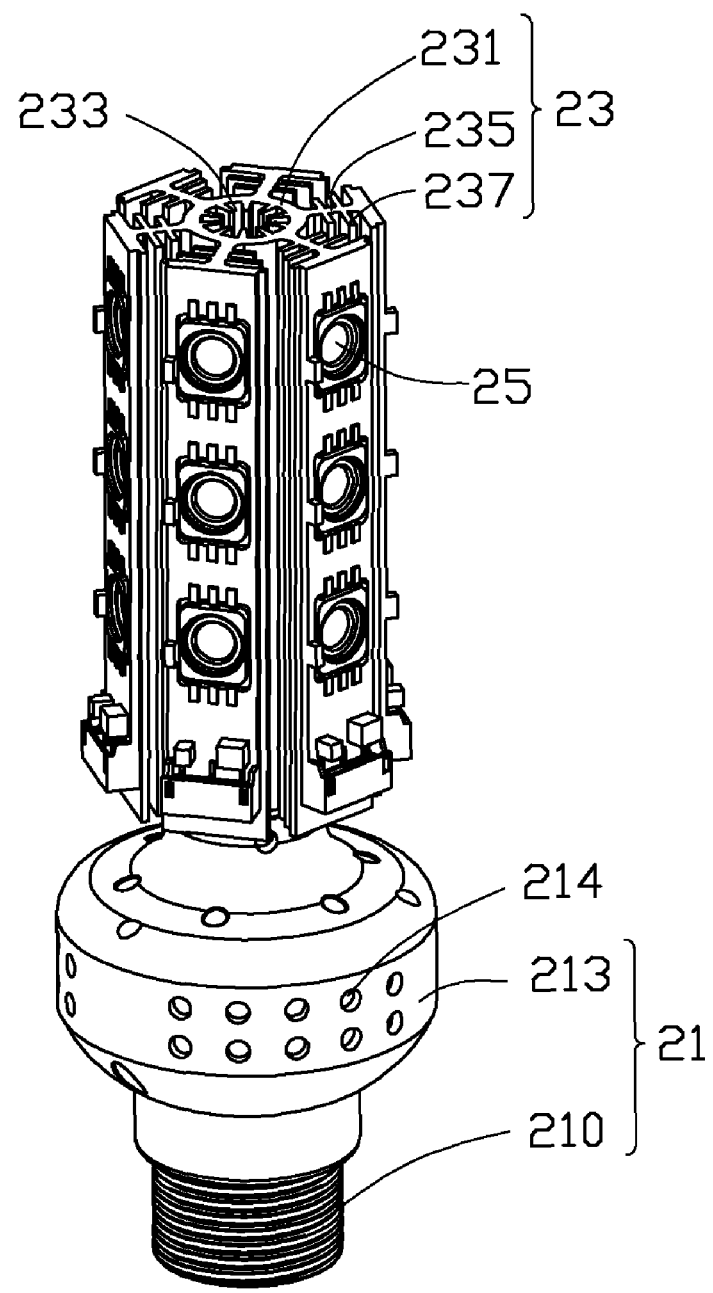
FIG. 3 shows an LED lamp of the solar LED lamp of FIG. 2.

Referring to FIG. 2 and FIG. 3, the LED lamp 20 comprises a lamp base 21, a heat sink 23 coupled to the lamp base 21 and a plurality of LEDs 25 thermally attached to a periphery of the heat sink 23.

Figure 5:
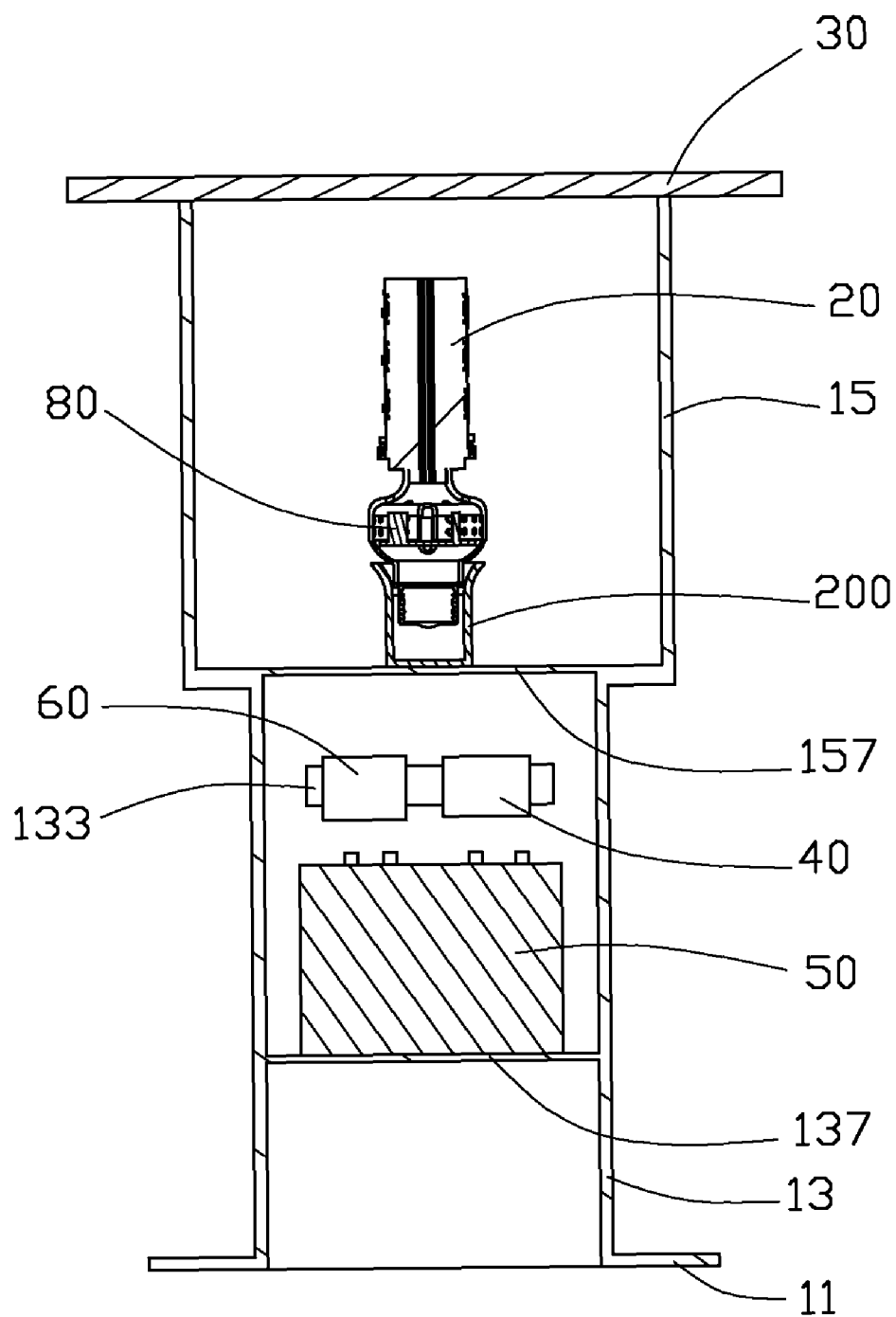
FIG. 5 is a sectional view of FIG. 1.

The lamp base 21 comprises a lamp holder 210, and a hollow bulb 213 connecting with the lamp holder 210. The lamp holder 210 has screw threads formed on a periphery thereof for fitting in a lamp socket 200. The socket 200 comprises a cylindrical bottom portion 201 and a trumpet-shaped upper portion 203. The bulb 213 has a plurality of through holes 214 defined therein. The through holes 214 communicate an inner space of the bulb 213 and an outer space outside the bulb 213. Referring to FIG. 5, a constant current controller 80 is accommodated in the bulb 213.

The heat sink 23 is integrally made of a metal with a good heat conductivity, such as aluminum, copper or an alloy thereof. The heat sink 23 has an elongated hollow cylinder 231. The cylinder 231 has a plurality of first fins 233 extending inwardly from an inner wall thereof toward an inner space of the cylinder 231. The inner space of the cylinder 231 is communicated with the inner space of the bulb 213; thus, air can flow through the through holes 214 into the bulb 213 and then move upwardly therefrom through the inner space of the cylinder 231. The heat sink 23 has a plurality of conducting arms 235 radially extending outwardly from an outer wall of the cylinder 231. A plurality of second fins 237 are formed on two opposite lateral sides of each of the conducting arms 235. The LEDs 25 are attached to outer ones of the second fins 237.

Referring to FIG. 1 and FIG. 5, the solar panel 30 is covered onto an top end of the second wall 153 of the second sleeve 15 of the envelope 10. The solar panel 30 has a diameter larger than that of the second wall 153.

Referring to FIG. 2 and FIG. 5, the storage battery 50 is positioned on the first supporting plate 137 of the first sleeve 13 of the envelop 10. The charging controller 40 and the solar power controller 60 are attached to the first wall 131 of the first sleeve 13 and located between the storage battery 50 and the bottom 151 of the second sleeve 15 of the envelope 10. Corresponding to the charging controller 40 and the solar power controller 60, the first wall 131 defines a through hole 133 for air circulating into and out of the first room 135 and the second room 155 of the envelope 10. The LED lamp 20 is positioned on the second supporting plate 157 of the second sleeve 15.

In use, in daylight time, the solar panel 30 collects solar energy, and converts the solar energy to electrical energy; the electrical energy is charged into and reserved in the storage battery 50 via the solar power controller 60 and the charging controller 40. In nighttime, the storage battery 50 provides electrical energy to the LED lamp 20. The constant current controller 80 adjusts a current of the electrical energy from the storage battery 50 for the LEDs 25, and the LEDs 25 are lightened.

The solar LED lamp can be simply used, no cable needs to be laid, no external power needs to be supplied, and no manual control is needed. The solar LED lamp is charged voluntarily in daylight time, and gives off light voluntarily in nighttime. The solar LED lamp can be placed in city greenery patches, squares, parks, schools, and offices or other places.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A solar LED lamp comprising:

an envelope comprising a seat, a first sleeve extending from the seat and a second sleeve extending from the first sleeve;

an LED lamp being received in the second sleeve of the envelope;

a solar panel covering the second sleeve of the envelope for collecting solar energy and converting the solar energy to electrical energy;

a storage battery being accommodated in the first sleeve of the envelope for reserving the electrical energy from the solar panel and providing the electrical energy to the LED lamp; and a solar controller controlling the solar panel to convert the solar energy to the electrical energy or not wherein the first sleeve of the envelope comprises a first wall surrounding a first room, and a first supporting plate extending from the first wall and surrounded by the first wall, the storage battery being positioned on the first supporting plate and supported by the first supporting plate;

wherein the second sleeve of the envelope comprises a bottom extending radially and outwardly from a top end of the first sleeve, and a second supporting plate extending from the bottom, the LED lamp being positioned on the second supporting plate and supported by the second supporting plate;

wherein the LED lamp comprises a bulb, a heat sink engaging with the bulb, and a plurality of LEDs attached to the heat sink, the bulb having a plurality of through holes therein and the heat sink having an inner space communicating with an inner space of the bulb, whereby air can flow into the inner space of the bulb through the through holes and then move upwardly from the inner space of the bulb through the inner space of the heat sink;

wherein the bulb of the LED lamp has a constant current controller accommodated therein to adjust current of the electrical energy from the storage battery;

wherein the LED lamp has a threaded lamp holder extending downwardly from the hollow bulb;

wherein the LED lamp is positioned in the second sleeve via a lamp socket engaging with the threaded holder; and wherein the lamp socket has a cylindrical portion engaging with the second sleeve of the envelope and a trumpet-shaped upper portion engaging with the threaded holder of the LED lamp.

\* \* \* \* \*